US010255451B2

(12) United States Patent
Rosenberg et al.

(10) Patent No.: US 10,255,451 B2
(45) Date of Patent: Apr. 9, 2019

(54) PROGRESSIVE DEVICE LOCK (71) Applicant: Cisco Technology, Inc., San Jose, CA (US)

(72) Inventors: Jonathan Rosenberg, Freehold, NJ (US); Dylan Fiesel, Mill Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 240 days.

(21) Appl. No.: 15/175,092

(22) Filed: Jun. 7, 2016

(65) Prior Publication Data
US 2017/0351869 A1    Dec. 7, 2017

(51) Int. Cl.
G06F 21/45   (2013.01)
G06F 21/62   (2013.01)
G06F 21/57   (2013.01)
G06F 21/60   (2013.01)

(52) U.S. Cl.
CPC .......... *G06F 21/6218* (2013.01); *G06F 21/45* (2013.01); *G06F 21/57* (2013.01); *G06F 21/604* (2013.01); *G06F 21/6245* (2013.01); *G06F 2221/032* (2013.01)

(58) Field of Classification Search
None
See application file for complete search history.

(56) References Cited

U.S. PATENT DOCUMENTS 7,849,320 B2   12/2010 Raikar et al.
8,245,026 B1 *  8/2012 Moore ............... G06F 21/45 713/1
8,713,173 B2   4/2014 Kacherov et al.
8,732,822 B2   5/2014 Schechter et al.
9,060,026 B2   6/2015 Henderson et al.
9,123,080 B2 *  9/2015 Terleski ............ G06Q 50/01
9,171,139 B2   10/2015 Newell
(Continued)

FOREIGN PATENT DOCUMENTS

CN    104574040    4/2015

OTHER PUBLICATIONS

Pin Lock and Other Updates to Outlook for IOS and Android; Office Blogs, by Office 365 Team, Can be found at: https://blogs.office.com/2015/02/17/pin-lock-updates-outlook-ios-android/.
What is a Device Policy Controller; Google Android for Work Help; Can be found at: https://support.google.com/work/android/answer/6192678?hl=en&ref_topic=6151012.
Set Up Mobile Devices for Management; Google Apps Administrator Help. Can be found at: https://support.google.com/a/answer.6328699?hl=en&rd=1#top&expand.
(Continued)

*Primary Examiner* — Fatoumata Traore
(74) *Attorney, Agent, or Firm* — Polsinelli PC (57) ABSTRACT A method for securing an enterprise application on a computing device includes: defining at least one monitored action, where the monitored action is an access of sensitive information in the enterprise application, defining a maximum number of instances of the at least one monitored action to be allowed while the computing device is not secured by a device-level lock, detecting at least one instance of the at least one monitored action, determining whether the computing device is secured by the device-level lock, and if according to the determining, the computing device is not secured by the device-level lock: displaying a warning message in response to the instances, incrementing a warning counter in response to the detecting, and if the warning counter exceeds the maximum number of the instances, preventing access to the enterprise application.

20 Claims, 4 Drawing Sheets (56) References Cited

U.S. PATENT DOCUMENTS

| | | | |
|---|---|---|---|
| 9,178,852 B2 | 11/2015 | Bettini et al. | |
| 2009/0125850 A1* | 5/2009 | Karstens | G06F 3/0481 715/866 |
| 2012/0297444 A1* | 11/2012 | Kacherov | H04L 63/20 726/1 |
| 2013/0167250 A1* | 6/2013 | Balasubramanian | G06F 21/10 726/28 |
| 2014/0282877 A1* | 9/2014 | Mahaffey | H04L 63/0853 726/3 |
| 2014/0282977 A1* | 9/2014 | Madhu | G06Q 50/265 726/7 |
| 2015/0254464 A1* | 9/2015 | Shah | H04W 12/04 726/18 |

OTHER PUBLICATIONS

Clarke, N.L. et al; "Towards a Flexible, Multi-Level Security Framework for Mobile Device"; In Proc. of the 10th Security Conference, pp. 4-6. 2011. Found at: http://citeseerx.ist.psu.edu/viewdoc/download?doi=10.1.1.677.9221&rep=rep1&type=pdf.

Riva, Oriana et al; "Progressive Authentication: Deciding When to Authenticate on Mobile Phones"; Presented as part of the 21st USENIX Security Symposium (USENIX Security 12), pp. 301-316. 2012.

Van Bruggen, Dirk et al; "Modifying Smartphone User Locking Behavior"; In Proceedings of the Ninth Symposium on Usable Privacy and Security (SOUPS '13), Jul. 24, 2013. ACM, New York, Article 10, 14 pages. http://doi.acm.org/10.1145/2501604.2501614.

* cited by examiner

PROGRESSIVE DEVICE LOCK

FIELD OF THE INVENTION

The present invention generally relates to securing enterprise applications on smartphones.

BACKGROUND OF THE INVENTION

Enterprise applications, such as, for example, Cisco Spark®, Cisco Jabber®, Dropbox®, etc. are widely available for smartphones. Such applications are associated with a specific enterprise, e.g., an organization or a place of work, and typically provide access to confidential content and/or services to a closed/monitored group of users. Consequently, loss of these devices poses a security risk for the enterprise.

One common method for securing an enterprise application is to require the implementation of a device-level lock for the smartphone device. Common examples of such device-level locks are PIN (personal identification number) locks, alphanumeric passwords, and biometric locks using technologies such as fingerprint scanning and/or voice recognition. The device's user sets a device-level lock for the device and uses a key, e.g., a PIN, password, fingerprint, etc., to unlock the device before beginning/continuing use. A device-level lock is typically enforced by mobile device management (MDM), or by the enterprise application itself (which exits if a device-level lock is not set).

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method for securing an enterprise application on a computing device includes: defining at least one monitored action, where the monitored action is an access of sensitive information in the enterprise application, defining a maximum number of instances of the at least one monitored action to be allowed while the computing device is not secured by a device-level lock, detecting at least one instance of the at least one monitored action, determining whether the computing device is secured by the device-level lock, and if according to the determining, the computing device is not secured by the device-level lock: displaying a warning message in response to the instances, incrementing a warning counter in response to the detecting, and if the warning counter exceeds the maximum number of the instances, preventing access to the enterprise application.

A method for providing access to an enterprise application on a computing device, the method comprising: allowing initial use of said enterprise application on said computing device, wherein a device-level lock is not set for said computing device; upon user access of sensitive or confidential information in said enterprise application, displaying a warning message, wherein said warning message indicates that said device-level lock is required for continued use of said enterprise application; and when said user access of sensitive or confidential information occurs a maximum pre-defined number of times, requiring that said device-level lock be set for said computing device.

Detailed Description of Example Embodiments

It will be appreciated that the smartphone device used to access an enterprise application may not necessarily be provided by (and/or directly controlled by) the associated enterprise. Rather, some users may access enterprise application using personally owned smartphone devices.

It will be appreciated by one of ordinary skill in the art, that device-level locks are implemented on the device level. The device-level lock is activated upon device startup; the user typically cannot access any of the device's functionality until the key is input to unlock the device. A device-level lock may also be implemented as a screen lock that is activated via screen-saver functionality; i.e., when no user input is detected for a pre-defined period of time, the use may be prevented from further input until the key is entered (although already running applications may continue in the background. Accordingly, it will be appreciated that while the device-level lock may be required in order to use a single application, by circumstance it may affect the user's overall experience with all of the applications on the device.

When a user of a device without a device-level lock downloads and runs an enterprise application, the application will check that a device-level lock is already set. If a device-level lock hasn't already been set for the device (i.e., the user has not yet defined a device-level lock for use with the device), the application will prompt the user to set a device-level lock. The user may then elect to go to the device's settings utility to set the device-level lock, or, alternatively, exit the application.

Though some users may choose to set a device-level lock at this time, many will not. It will be appreciated that some users, particularly (although not exclusively) users using their own personal devices, may be reluctant to implement a device-level lock in order to access a specific enterprise application. Such users may prefer not to set device-level locks or otherwise secure their device in the interests of personal convenience. It will also be appreciated at the time of installation and initial execution, a user may not have previously used the application. If their first exposure to the application is at the time of installation, they may be reluctant to set a device-level lock just to use a new application with which they are not previously familiar. Consequently, there is a strong likelihood that in such cases the user will not adopt the application, preferring instead to forego the functionality of the enterprise application and/or instead to use non-enterprise alternatives that do not impose such restrictions.

It will therefore be appreciated that a device-level lock requirement may potentially present a serious impediment to the adoption of an enterprise application by new users. However, it will also be appreciated in the absence of a device-level lock requirement, loss of an unlocked device may expose the enterprise to the risk of sensitive/confidential information being available to unauthorized users of the enterprise application.

In accordance with embodiments described herein, an enterprise application may be configured with a progressive device-level lock requirement that may enable a user to gradually become familiar with an enterprise application before being required to implement a device-level lock. The progressive device-level lock requirement may be based on actual access of sensitive/confidential information/functionality by the user via the enterprise application. Accordingly, a user may download and install the enterprise application without setting a device-level lock. The user may also be allowed to open the enterprise application. However, as the user uses and continues to use the functionality of the enterprise application, the user may be progressively warned that further use may require setting a device-level lock, until ultimately the user is blocked from using the enterprise application without a device-level lock.

It will be appreciated by a person of ordinary skill in the art that until such time as the user actually shares or attempts to access content in the enterprise application, there may be limited exposure to security risk; at that point, the device may not yet contain any sensitive or confidential information. However, as the user repeatedly shares/accesses content through normal use of the enterprise application, the exposure to security risk increases. Accordingly, instead of prompting the user to set a device-level lock when the enterprise application first launches, such sharing/accessing of sensitive/confidential information may be monitored, and the user may be provided with an escalating series of warnings as a function of continued access. Each of the user actions performed by enterprise application for the sharing/accessing of sensitive/confidential information may be defined as monitored actions. For example, but not limited to, posting of content may be defined as a monitored action; downloading content may be defined as a monitored action; participating in a digital conversation may be defined as a monitored action; etc.

Figure 1A:
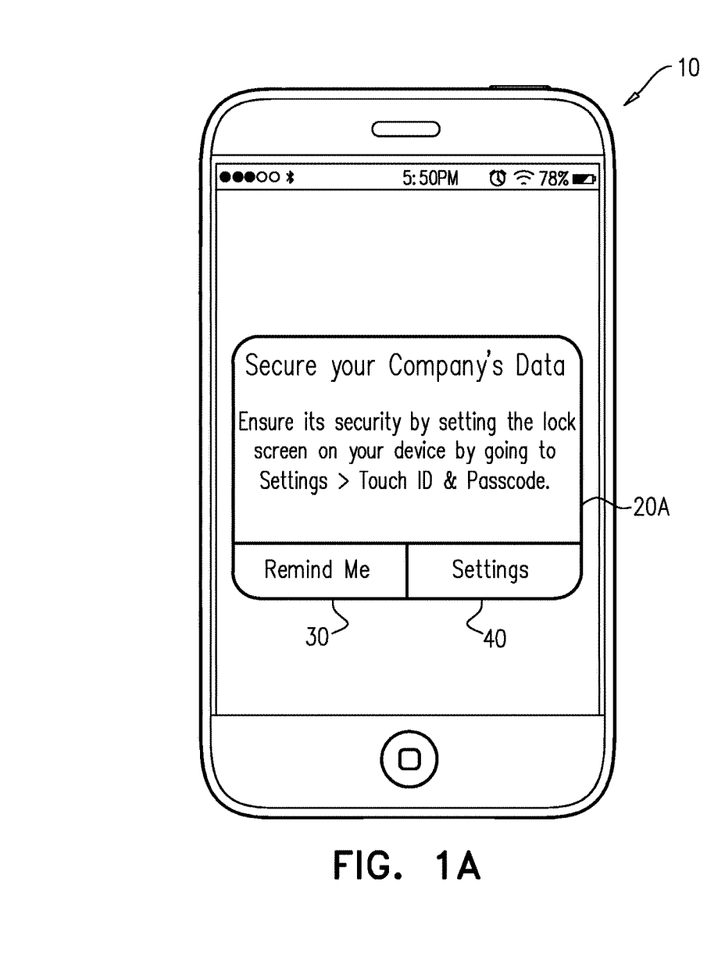
FIGS. 1A-D are simplified pictorial illustrations of a display of an exemplary enterprise application, constructed and operative in accordance with embodiments described herein.

Reference is now made to FIG. 1A which is simplified pictorial illustrations of a warning display 10 of an exemplary enterprise application, constructed and operative in accordance with embodiments described herein. In the exemplary embodiment of FIG. 1A, warning display 10 may be associated with an enterprise application such as, for example, Cisco Spark® that may be used to exchange possibly sensitive/confidential information between users associated with an enterprise. It will be appreciated that the use of Cisco Spark® is exemplary; the embodiments described herein may support the implementation of a progressive device-level lock in generally the same manner for any suitable enterprise application that may be subject to security restrictions by an enterprise.

Warning display 10 of FIG. 1A comprises warning message 20A, reminder button 30 and settings button 40. Warning display 10 of FIG. 1A may be provided by the enterprise application in response to a first access of confidential/sensitive information by the user of the enterprise application. For example, according to an exemplary embodiment where the enterprise application is Cisco Spark®, such a first access may be the first time the user accesses a chat message, posts a chat message, or posts/opens an attachment. Warning message 20A may represent a first warning to the user that continued use of the enterprise application may be predicated on eventually (but not necessarily immediately) setting a device-level lock. Continued use of the enterprise application may therefore, for example, be prevented after one, two, three, four, five, or more additional such accesses.

Reminder button 30 and settings button 40 may represent two user selectable options for responding to warning message 20A. The user may select settings button 40 to access the device's built-in functionality for setting a device-level lock. Alternatively, the user may select reminder button 30, which may effectively postpone setting a device-level lock until a later time.

Figure 1B:
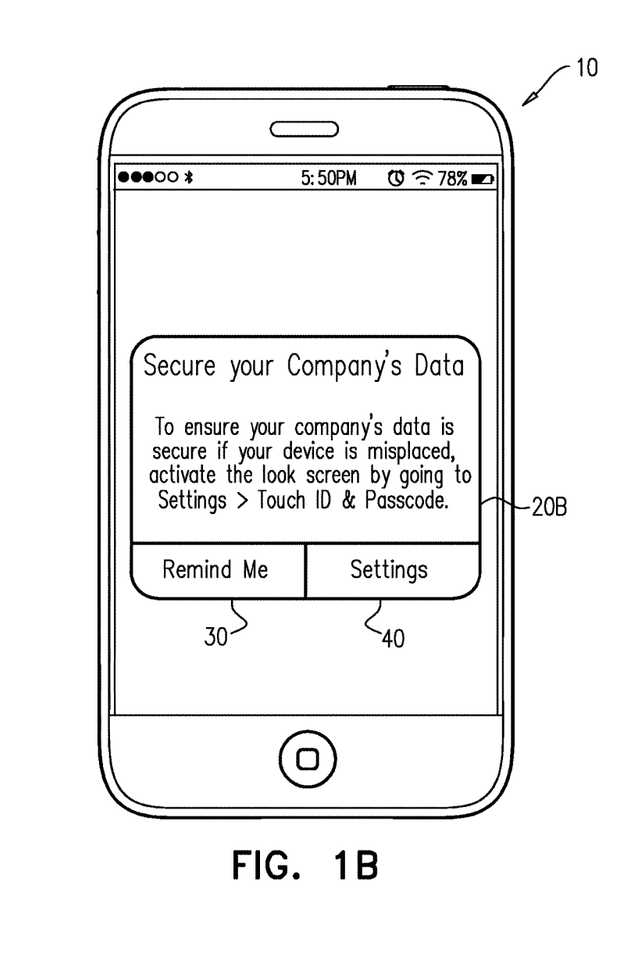

In accordance with an exemplary embodiment described herein, warning display 10 as depicted in FIG. 1A may be presented to the user the first time sensitive/confidential information is accessed. The second time such access is detected, warning display 10 as depicted in FIG. 1B (to which reference is now made) may be presented to the user. It will be appreciated that warning message 20B may represent a second warning to the user that continued use of the enterprise application may be predicated on eventually (but not necessarily immediately) setting a device-level lock. As with the embodiment of FIG. 1A, the user may select either reminder button 30 or settings button 40 in order to continue.

Figure 1C:
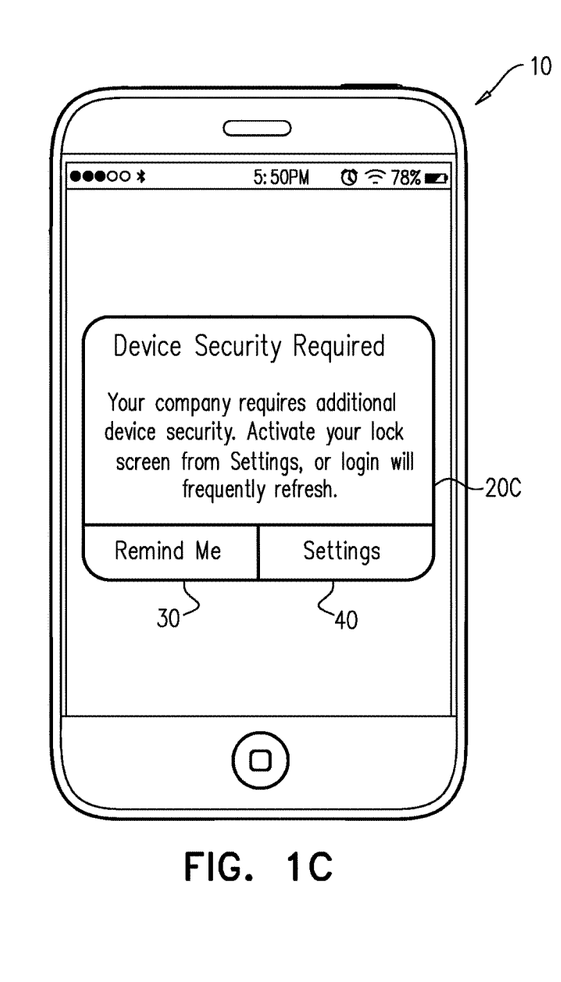

Similarly, warning display 10 as depicted in FIG. 1C (to which reference is now made) may be presented to the user as a final warning that continued use of the enterprise application is predicated on setting a device-level lock. As depicted in FIG. 1C, warning message 20C may be worded to indicate that it represents a final warning. As such, the enterprise application may provide at least two warnings in which the user may bypass the device-level lock request. However, upon presentation of the third warning, the user is required to set a device-level lock in order to continue to use the application. As with the embodiment of FIG. 1A, the user may select either reminder button 30 or settings button 40 in order to continue.

Figure 1D:
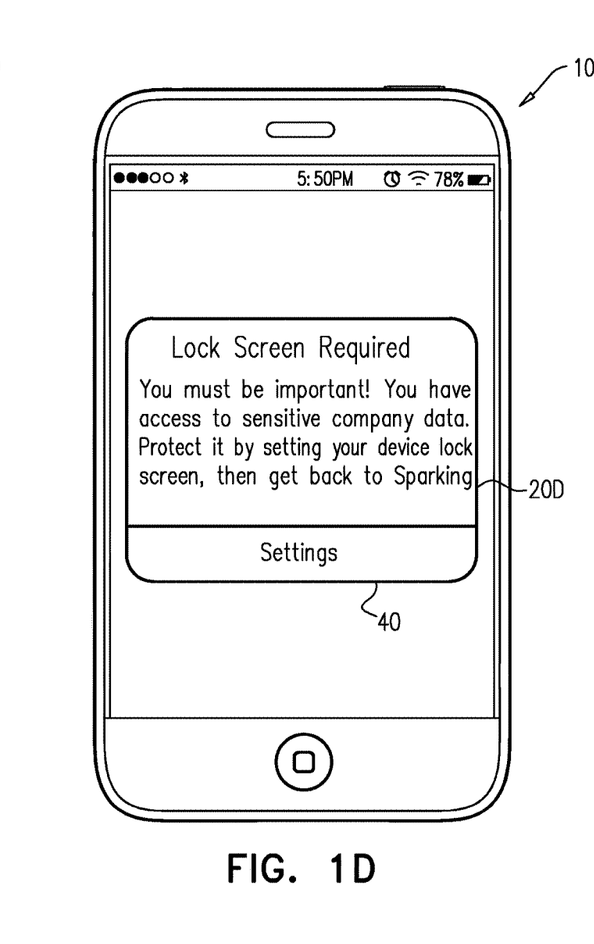

Thereafter, as shown in FIG. 1D, to which reference is now made access to the enterprise application may blocked without allowing the user to request to be reminded later; warning display 10 comprises settings button 40 as per the embodiments of FIGS. 1A-D, but does not comprise reminder button 30. The language of warning message 20D indicates that in order to continue using the enterprise application, a device-level lock (such as, for example, a lock screen) is now required. The user may therefore access the settings option via settings button 40, or exit the enterprise application using known functionality.

It will be appreciated that the number of accesses detected before presenting warning displays 10 from FIGS. 1B and 1C may be configurable. For example, warning message 20B may be presented to the user twice, three times, etc. before warning message 20C is presented. It will similarly be appreciated that the number of differently worded warning messages 20 may be configurable.

Figure 2:
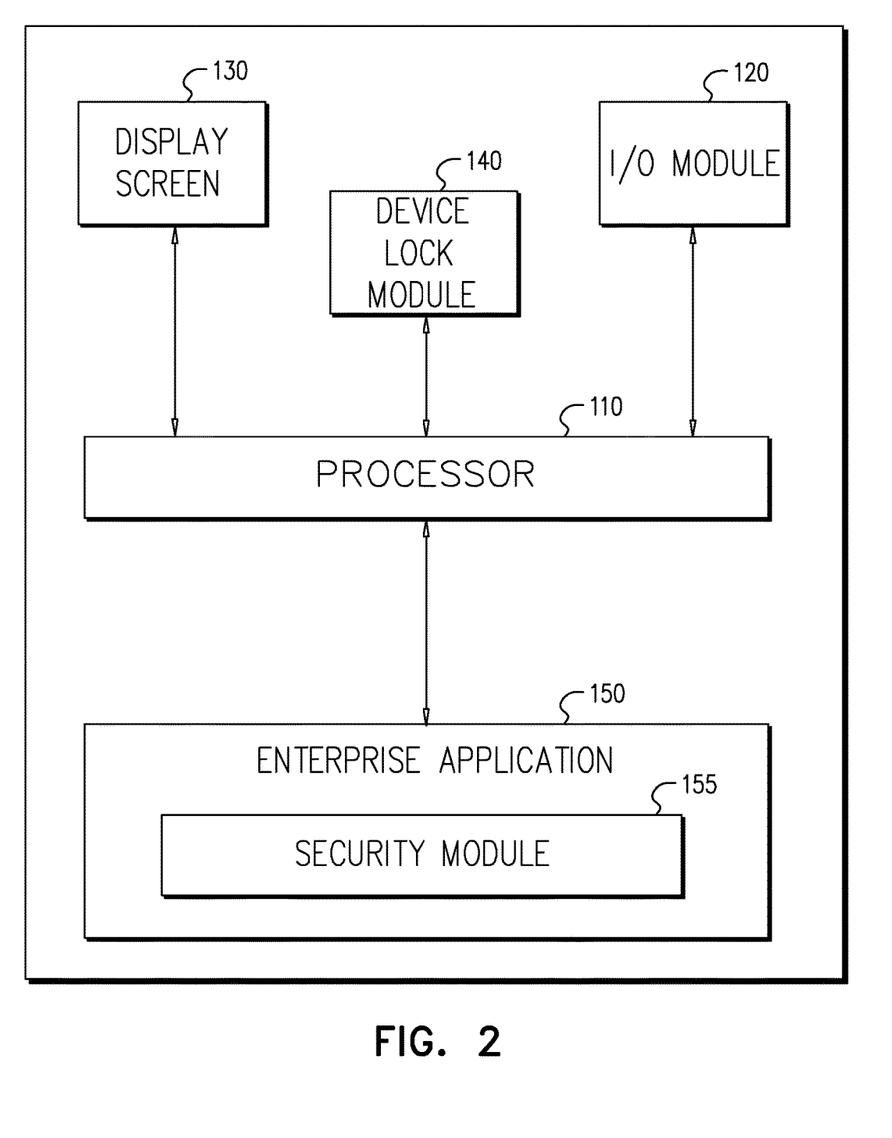
FIG. 2 is a block diagram of a computing device operative to run the exemplary enterprise application of FIGS. 1A-D.

Reference is now made to FIG. 2 which is a block diagram of a computing device 100 constructed and operative in accordance with embodiments described herein to provide an exemplary collaboration application configured to present displays 10 as described with respect to FIGS. 1A-D. As depicted in FIGS. 1A-D, computing device 100 may be implemented on a smartphone device. However, it will be appreciated by one of ordinary skill in the art that it may be implemented on other portable computing devices that may be exposed to increased risk of loss or theft, such as, for example, computer tablets and/or laptop computers.

It will be appreciated by one of skill in the art that computing device 100 comprises hardware and software components that may provide at least the functionality of the embodiments described herein. For example, computing device 100 may comprise at least processor 110, I/O module 120, display screen 130, device lock module 140, and enterprise application 150. I/O module 120 may be implemented as a transceiver or similar means suitable for transmitting and receiving data between computing device 100 and another device. Such data may be, for example, chat messages, emails, attachments, transaction data, etc. It will be appreciated that display screen 130 may be implemented as a built-in integrated component of computing device 100, or alternatively as an attached peripheral device.

Device lock module 140 may represent functionality for setting and enforcing a device-level lock for computing device 100. Device lock module 140 may be implemented as part of the operating system of computing device 100.

Enterprise application 150 may be any suitable application implemented in software and/or hardware that may be operative to provide enterprise functionality to a user as described hereinabove. For example, enterprise application 150 may be implemented as Cisco Spark®. It will, however, be appreciated that enterprise application 150 may be implemented as any suitable application that is operative to facilitate the dissemination and/or receipt of sensitive/confidential information by a restricted group of users. Accordingly, the embodiments described herein may also support, for example, financial transaction applications, time reporting applications, human resource applications, email applications, etc. It will similarly be appreciated that in any case, the specific actions to be considered as "access of sensitive/confidential information" may be defined on a per application basis. Alternatively, or in addition, the specific actions may be defined at least in part based on specific functionality used, e.g., I/O reads/writes, application programming interface (API) calls, etc.

It will be appreciated that computing device 100 may comprise more than one processor 110. For example, one such processor 110 may be a special purpose processor operative to execute enterprise application 150. Enterprise application 150 comprises security module 155. Security module 155 may be implemented in software and/or hardware and may be employed as necessary by enterprise application 150 to progressively enforce a device-level lock requirement on the use of enterprise application 150. It will be appreciated by one of ordinary skill in the art that some or all of the functionality of security module 155 may be implemented on an enterprise server (not shown) that may be configured to facilitate the operation of enterprise application 150. For example, the enterprise server may store some or all of the content accessed by the user via enterprise application 150 as described hereinabove.

Figure 3:
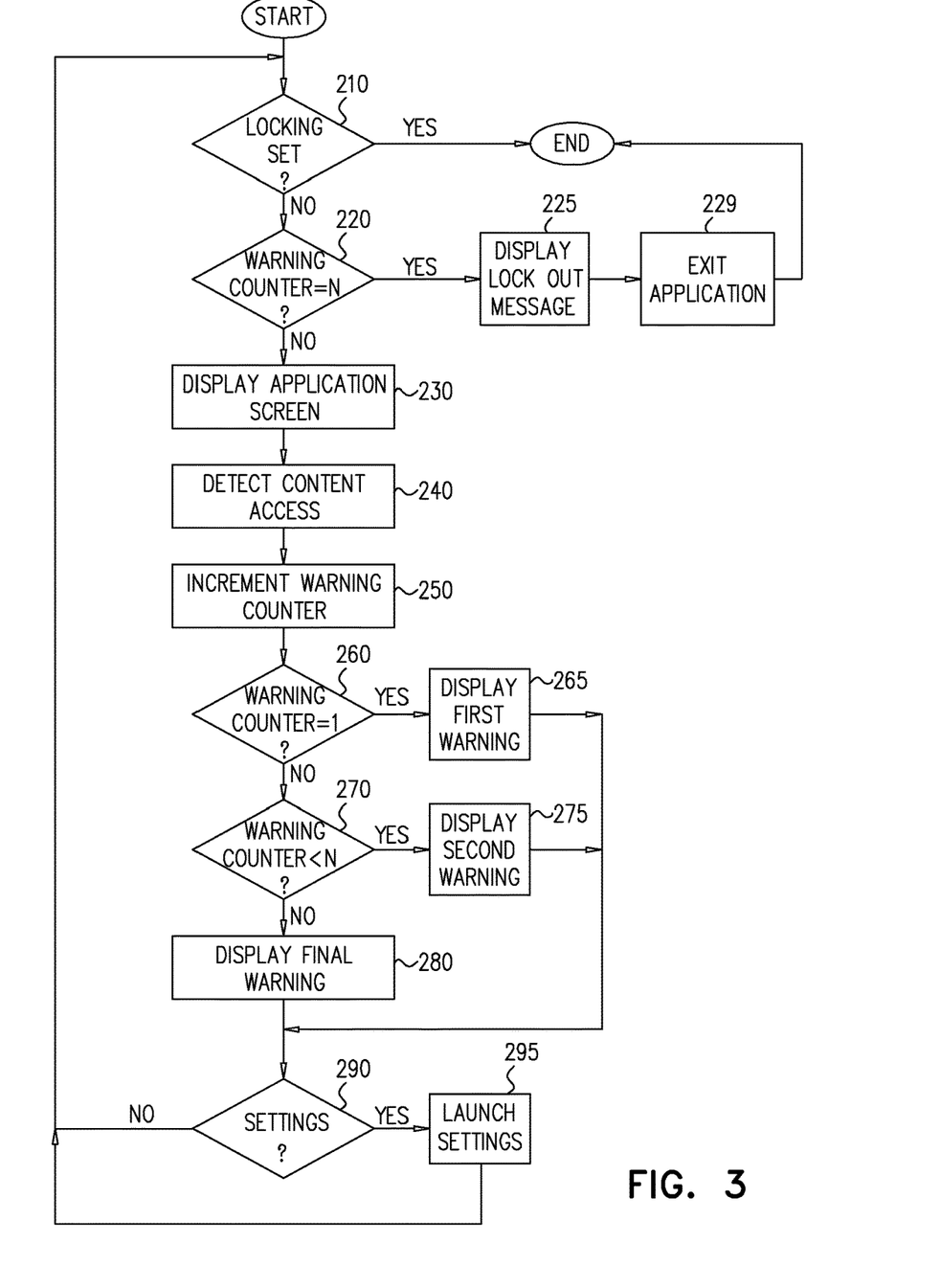
FIG. 3 is a flowchart of an exemplary Device-level lock enforcement process to be executed on the smartphone device of FIG. 1 within the context of the exemplary enterprise application of FIGS. 1A-D.

Reference is now made to FIG. 3 which illustrates a flowchart of an exemplary device-level lock enforcement process 200 to be executed on the computing device of FIG. 2 within the context of the exemplary enterprise application of FIGS. 1A-D. Process 200 may be invoked by security module 155 upon startup of enterprise application 150. Security module 155 may use an operating system application programming interface (API) to check whether a device-level lock is set for computing device 100 (step 210). If a device-level lock has already been set, process 200 may end.

Otherwise, if a device-level lock has not been set, security module 155 may check if a maximum number of device-level lock warnings has already been issued to the user. For example, security module 155 may initialize a warning counter as zero during the installation and setup of enterprise application 150. Security module 155 may check if the warning counter equals N (step 220), where N is a predefined maximum number of warnings to be issued before preventing continued use of enterprise application 150. If the warning counter equals N, security module 155 may display (step 225) a warning message 20D (FIG. 1D) informing the user that further use of enterprise application will not be permitted without first setting a device-level lock. Enterprise application 150 may then exit (step 229), and process 200 may end. It will be appreciated that step 220 may be operative to prevent a user from circumventing a required device-level lock by initially setting the device-level lock in response to previous warnings, and then removing it after having once satisfied the device-level lock requirement in response to warning messages 20 (FIGS. 1A-D). In accordance with an embodiment described herein, the maximum number of device-level warnings may be set and reset according to a time-interval basis. For example, the user of enterprise application 150 may be allowed to access sensitive/confidential information twice a month without setting a device-level lock. Accordingly, the warning counter may be reset to zero every month, thereby effectively allowing the user to continue using enterprise application 150 on an occasional basis.

If the warning counter is less than N (step 220), then security module 155 may permit enterprise application 150 to display (step 230) an application screen for enterprise application 150, i.e., to permit the user to access non-sensitive information in enterprise application 150.

In accordance with embodiments described herein, specific user actions performed by enterprise application may be defined as monitored actions. Accordingly, each specific action by the user of sharing/accessing of sensitive/confidential information may be monitored, and the user may be provided with an escalating series of warnings as a function of continued access. During operation of enterprise application 150, security module 155 may detect (step 240) a monitored action, i.e., user access of sensitive/confidential information. Such access may be, for example, but not limited to, the posting of a message chat, the display of a message chat, the opening of content (e.g., a photo, PowerPoint presentation, Word document, video, etc.), the entering of a transaction, access of employee information, the reading or sending of an email, etc.

For each such access of sensitive/confidential information, security module may increment (step 250) the warning counter by one. If the warning counter equals one (step 260), i.e., the current access of sensitive/confidential information is the first such access for enterprise application 150, security module 155 may display (step 265) a first warning such as, for example, warning message 20A (FIG. 1A). It will be appreciated that the language used for warning message 20A is only a single example, in operation the language of the first warning may be any message suitable for informing the user that a device-level lock is required for uninterrupted use of enterprise application 150.

As depicted in FIG. 1A, warning display 10 may comprise selectable options to either access the device settings to set a device-level lock, or to be reminded at a later time. If user selection of the device settings option is detected (step 290), security module 155 may use an API to launch (step 295) the device's settings utility, i.e., to access device lock module 140 (FIG. 2). Process control may then return to step 210.

If it is not the first access of sensitive/confidential information for enterprise application 150 (step 260), security module 155 may check whether the warning counter is less than N (step 270), i.e., whether the maximum number of warning messages have already been issued. If the warning counter is less than N, security module 155 may display (step 275) a second warning such as, for example, warning message 20B (FIG. 1B). It will be appreciated that the language used for warning message 20B is only a single example, in operation the language of the second warning may be any message suitable for informing the user that a device-level lock is required for uninterrupted use of enterprise application 150. It will similarly be appreciated that security module 155 may be configurable to continue displaying the first warning multiple times before displaying the second warning. Process control may then flow to step 290 as described hereinabove.

If the warning counter equals N (step 270), i.e. the maximum number of warning messages has been reached, security module 155 may display (step 280) a final warning such as, for example, warning message 20C (FIG. 1C). It will be appreciated that the language used for warning message 20C is only a single example, in operation the language of the final warning may be any message suitable for informing the user that a device-level lock is required for uninterrupted use of enterprise application 150. Process control may then flow to step 290 as described hereinabove.

It will be appreciated that process 200 need not necessarily be limited to the use of three warning messages. Process 200 may be configurable to employ additional warning messages depending on a current value of the warning counter. Similarly, process 200 may be configurable to use only one or two such warning messages provided multiple times before enterprise application 150 is locked from continued use.

In accordance with some embodiments described herein, different monitored actions may be accorded different weights for the purposes of incrementing the warning counter as described hereinabove. For example, accessing a group conversation between 1000 participants may be weighted differently than accessing a one-one conversation. Similarly, reading messages in a conversation may be weighted differently than posting messages. Similarly, posting/accessing content may be weighted differently than posting/reading messages. Alternatively, or in addition, specific monitored actions may be defined as mandatory device-level lock actions requiring a device-level lock regardless of the status of the warning counter.

It will be appreciated that embodiments described herein may support the generation and tracking of analytic details regarding which users have ultimately decided not to set device-level locks and instead decline to use enterprise application 150. These analytic details may be provided to an enterprise administrative function that may initiate contact with the relevant users to receive clarification regarding the circumstances of the decision to forego use of enterprise application 150. The administrative function may adjust the definition of sensitive/confidential information in order to promote more widespread use of enterprise application 150. For example, the administrative function may provide initial unlimited access to reading posts in a collaborative application; and only issue warnings when the user begins to contribute new posts to an ongoing conversation. In some situations, the administrative function may, at least temporarily, remove the device-level lock requirement entirely. Per an additional example, if an exemplary enterprise application 150 is already deployed without a device-level lock requirement, the analytic details may provide an indication regarding how many users may abandon use of enterprise application 150 is a device-level lock requirement is instituted.

It will be appreciated that the embodiments described herein provide an improved method for securing enterprise applications while increasing the likelihood that the security method does not dissuade users from actually using the application. It will similarly be appreciated that by differentiating between access of sensitive/confidential information and access of non-sensitive/non-confidential information, the embodiments described herein may enable a user to become familiar with an enterprise application before having to decide whether or not to set a device-level lock for use as a pre-condition for using the enterprise application.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for securing an enterprise application on a computing device, the method comprising:
   defining at least one monitored action, where said monitored action is an access of sensitive information in said enterprise application;
   defining a maximum number of instances of said at least one monitored action to be allowed while said computing device is not secured by a device-level lock, said maximum number of instances defined according to time intervals;
   detecting at least one instance of said at least one monitored action;
   determining whether said computing device is secured by said device-level lock; and
   if, according to said determining, said computing device is not secured by said device-level lock:
      displaying a warning message in response to said at least one instance,
      incrementing a warning counter in response to said detecting, said warning counter initialized to zero at a beginning of each of said time intervals,
      allowing access to said enterprise application if said warning counter does not exceed said maximum number of instances, and
      preventing access to said enterprise application if said warning counter exceeds said maximum number of instances.

2. The method according to claim 1, wherein said defining said maximum number of instances includes defining said time intervals.

3. The method according to claim 1, wherein said access of sensitive information is at least one of downloading or viewing contact.

4. The method according to claim 1, wherein said access of sensitive information is at least one of a posting or display of a chat message.

5. The method according to claim 1, wherein said access of sensitive information is at least one of sending or reading of an email.

6. The method according to claim 1, wherein said access of sensitive information is a financial transaction.

7. The method according to claim 1, wherein said displaying said warning message comprises:
displaying a first warning message in response to the detecting the at least one instance of said at least one monitored action;
if said warning counter equals a pre-defined maximum number of warning messages, displaying a final warning message.

8. The method according to claim 1, wherein said detecting comprises using an application programming interface (API) to access an operating system of said computing device.

9. The method according to claim 1, further comprising:
according different weights to different said monitored actions, wherein said incrementing is accordance with said different weights.

10. The method according to claim 1, further comprising:
defining said at least one monitored action as a mandatory device-level lock action requiring said device-level lock; and
performing said preventing, wherein said at least one instance represents said mandatory device-level lock action.

11. The method according to claim 1, further comprising:
displaying a user selectable option to set said device-level lock;
detecting selection of said user selectable option; and
enabling setting said device-level lock.

12. The method according to claim 11, wherein said enabling comprises employing an API to access an operating system function for setting said device-level lock.

13. The method according to claim 1, wherein said device-level lock is activated upon startup of said computing device.

14. The method according to claim 1, wherein said device-level lock is activated upon activation of a screensaver on said computing device.

15. The method according to claim 1, wherein said device-level lock is a personal identification number (PIN) lock.

16. The method according to claim 1, wherein said device-level lock is a biometric lock.

17. The method according to claim 1, wherein said computing device is a smartphone.

18. The method according to claim 1, wherein said computing device is a laptop computer or a tablet computer.

19. A method for providing access to an enterprise application on a computing device, the method comprising:
allowing initial use of said enterprise application on said computing device without setting a device-level lock set for said computing device;
upon user access of sensitive information or confidential information in said enterprise application, displaying a warning message indicating said device-level lock is required for continued use of said enterprise application;
when said user access of said sensitive information or said confidential information does not exceed a maximum pre-defined number of times, allowing said continued use of said enterprise application, said maximum pre-defined number of times defined according to time intervals and a counter, said counter initialized to zero at a beginning of each of said time intervals, and
when said user access of said sensitive information or said confidential information occurs said maximum pre-defined number of times, requiring that said device-level lock be set for said computing device.

20. A computing device comprising:
a processor; and
a security module implemented via at least said processor, said security module operable to:
define at least one monitored action, said at least one monitored action being an access of sensitive information in an enterprise application installed on said computing device;
define a maximum number of instances of said at least one monitored action to be allowed while said computing device is not secured by a device-level lock;
detect at least one instance of said at least one monitored action;
determine whether said computing device is secured by said device-level lock;
generate a warning message in response to detecting said at least one instance;
increment a warning counter in response to detecting said at least one instance, said maximum number of instances defined according to time intervals, said warning counter initialized to zero at a beginning of each of said time intervals;
allow access to said enterprise application when said warning counter does not exceed said maximum number of instances; and
prevent access to said enterprise application when said warning counter exceeds said maximum number of instances.

* * * * *